April 24, 1962 M. MANNE Re. 25,163
EXPANDIBLE RING CONSTRUCTION HAVING LINKS WITH ATTACHING JAWS
Original Filed July 9, 1956 2 Sheets-Sheet 1
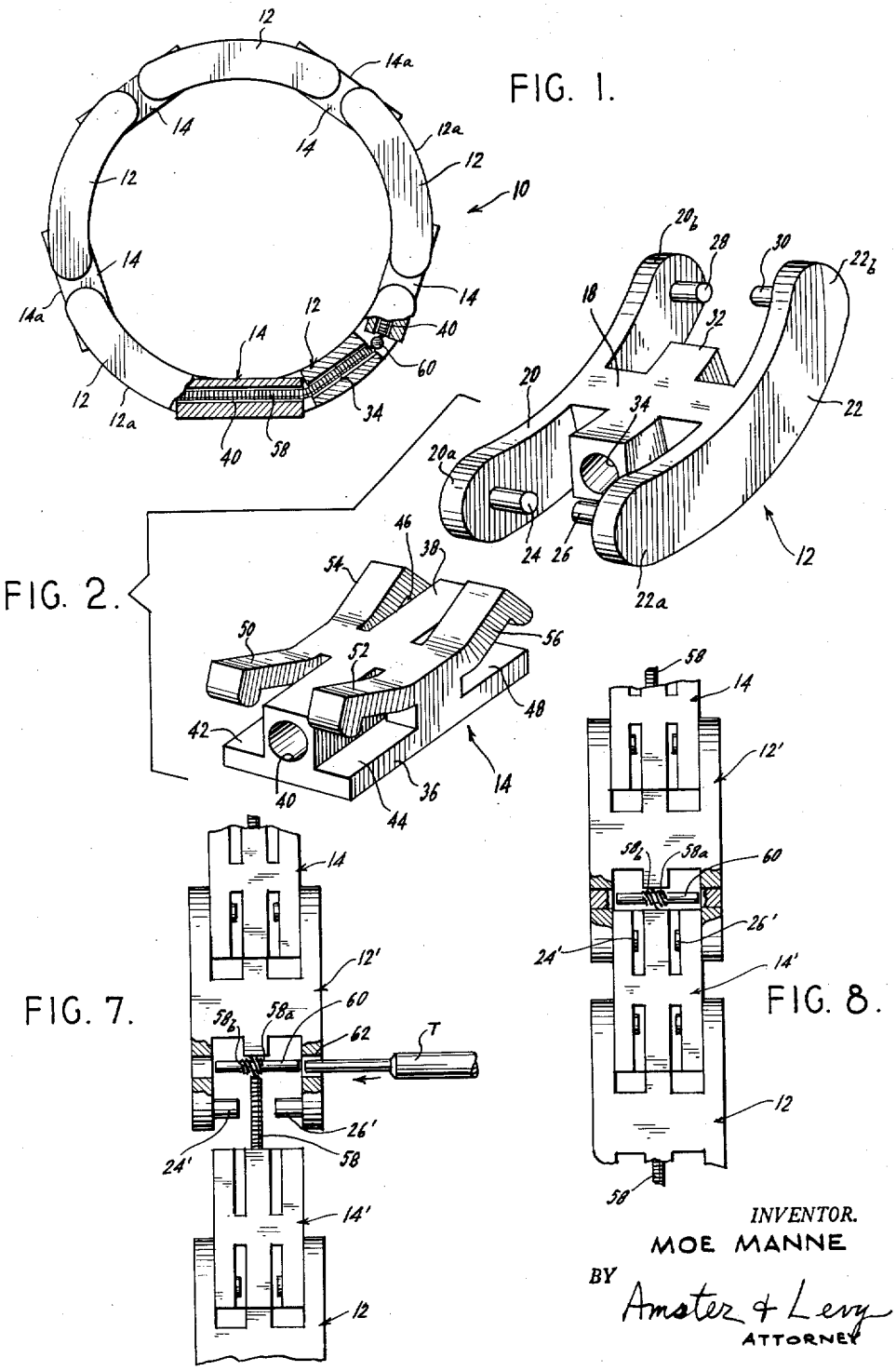
INVENTOR.
MOE MANNE
BY Amster & Levy
ATTORNEY

EXPANDIBLE RING CONSTRUCTION HAVING LINKS WITH ATTACHING JAWS

Original Filed July 9, 1956 2 Sheets-Sheet 2

INVENTOR.
MOE MANNE

BY Amster + Levy
ATTORNEY

United States Patent Office

Re. 25,163
Reissued Apr. 24, 1962

25,163

EXPANDIBLE RING CONSTRUCTION HAVING LINKS WITH ATTACHING JAWS

Moe Manne, Lawrence, N.Y.

Original No. 2,806,363, dated Sept. 17, 1957, Ser. No. 596,729, July 9, 1956. Application for reissue Feb. 26, 1959, Ser. No. 795,878
10 Claims. (Cl. 63—15.45)

Matter enclosed in heavy brackets [ ] appears in the original patent but forms no part of this reissue specification; matter printed in italics indicates the additions made by reissue.

The present invention relates generally to finger rings, and in particular to an improved expandible band suitable as a wedding ring.

A very popular type of wedding band or ring is one which incorporates a number of spaced stones and/or designs about its annular extent. The requirement for symmetry in design about the band makes it impractical for the jeweler to adjust the size of the ring, as is the present practice, by cutting the ring, sizing the same to the finger of the wearer, and assembling the cut ends of the ring. In that aesthetic requirements precludes this conventional method of sizing, it becomes necessary for the jeweler to stock a complete range of sizes, or to carry a sample line and conduct business on a special order basis.

To obviate this difficulty it has been suggested that an adjustable ring be constructed of multiple sections slidably linked together and provided with a spring arrangement for biasing the respective links into a position corresponding to the smallest of a range of sizes. Among the advantages attributed to these structures is the ability of the ring to adjust to the size of the finger of the wearer, the capacity of the ring to expand and to pass over a prominent knuckle, and the ability of the ring to conform to the size of the finger as the size of the finger becomes larger and smaller, as by the loss of weight, growth, and change in climates. The structures proposed in the prior art have been found to be impractical and thus have not come into any appreciable use by jewelry manufacturers.

Broadly, it is an object of the present invention to provide an improved finger ring, particularly useful as a marriage band. Specifically, it is within the contemplation of the present invention to provide an improved ring structure which makes possible mass production manufacture at comparatively low unit cost and in a manner compatible with accepted techniques for the manufacture of jewelry.

The improved finger ring of the present invention includes an annulus of ring sections which are connected together for limited movement relative to each other whereby the annulus is adjustable over a range of sizes between limit positions corresponding to a smallest size and a largest size. An annular spring is assembled within the ring body and provides uniformly distributed tension on the annulus to urge the same into the limit position corresponding to the smallest ring size. The construction of the annulus establishes the limit to which the ring may be stretched whereby the elastic limit of the spring is not exceeded when the annulus is expanded to the limit position corresponding to the largest ring size. Specifically, the ring sections which make up the finger ring include a first set of links each having longitudinally-extending bars and transversely extending pivots at each end thereof; and a second set, consisting of the remaining sections or links, having at each end thereof opposed longitudinal-extending parts defining an elongated slot with an entry end. At least one of the parts has a projection for partially constricting the entry end of its slot, and at least one of the parts is deformable toward the other of the parts to close off the entry end of the associated slot. The pivots and longitudinally-extending parts cooperate to connect the first and second sets of links or sections into the ring-like body which is adjustable to various ring sizes.

Among the advantages realized in accordance with the present invention are extreme ease of assembly, complete compatibility with present techniques for ornamenting rings (i.e., setting stones, polishing and the like), facility for mass production manufacture at comparatively low cost with ordinary tools, and ready replaceability of any of the component parts including the spring. The ring itself is exceptionally suited to the needs of the wearer, both aesthetically and functionally. It is possible to ornament the ring in a manner which virtually obscures the fact that the same is adjustable. When on the finger, the structure assures uniformly distributed tension on the various sections of the link which allows the ring sections to expand uniformly without disturbing the symmetry of the ring design. Thus, the functional requirements are achieved in a manner calculated not to detract from the decorative appearance of the ring.

The above brief description, as well as further objects, features, and advantages of the present invention will be best appreciated by reference to the following detailed description of a presently preferred ring construction and method of manufacture, when taken in conjunction with the accompanying drawings, wherein:

FIG. 1 is an elevational view with parts broken away and in section, of an expandible finger ring embodying features of the present invention;

FIG. 2 is an exploded perspective view, on an enlarged scale, of a ring section or body part and a connecting link which are incorporated into the expandible ring of FIG. 1;

FIG. 7 is a view similar to FIGS. 5 and 6, showing the spring in its assembled position prior to the linking together of the opposite ends of the band; and FIG. 8 is a view similar to FIG. 7 and showing the final step in a typical ring assembly.

Figure 3:
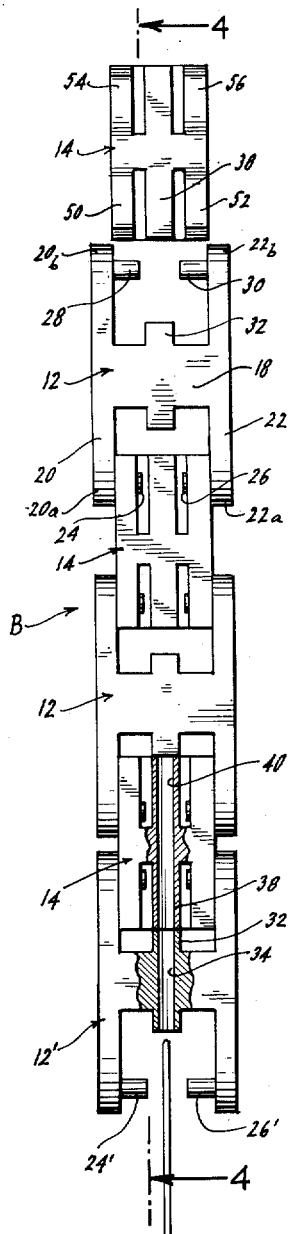
FIG. 3 is a stretch out view showing a number of sections and links slidably interconnected to partially complete a band of alternate sections and links in a first assembly step.

Referring now specifically to the drawings, there is shown in FIG. 1 an expandible ring constructed in accordance with the present invention and generally designated by the reference numeral 10. The ring 10 includes a number of body sections 12 which are connected together by a number of link sections 14. The connecting links 14 and the body section are arranged for limited expansion and contraction whereby the ring 10 may be adjusted to various sizes over a range of sizes. In a typical construction, the ring may be expanded from a size 5 to a size 9, or over a range of four sizes. In that it is conventional to have three graduations for each size, a typical ring can accommodate any one of twelve different sizes.

The body sections 12 of the ring 10 are of like structure and as seen best in the perspective showing of FIG. 2 are of generally H-shaped configuration. The body section 12 is cast in any appropriate metal by conventional techniques and includes a cross bar 18 connecting together side bars 20, 22. The section 12 is symmetrical both transversely and longitudinally and the cross bars 20, 22 have a curvature corresponding to the corresponding sector of the ring. The portions 20a, 22a of the side bars 20, 22 which project forwardly of the cross bar 18 carried integral, inwardly projecting, aligned pins 24, 26; similarly, the oppositely directed portions 20b, 22b of the side bars 20, 22 carry integral, inwardly projecting, aligned pins 28, 30. The aligned pairs of pins 24, 26 and 28, 30 serve as pivots and as part of slidable interconnections between ring sections as will be hereinafter described. The pairs of pins have their respective inner ends terminating at locations spaced from the longitudinal center or median plane of the body section 12.

Extending longitudinally of the body section 12 is a guide member 32 formed with a guide bore 34. The guide member 32 has the same curvature as the side bars 20, 22 and extends fore and aft of the cross bar 18. The diameter of the guide bore 34 is somewhat smaller than the spacing between the inner ends, of the respective pairs of pins 24, 26 and 28, 30 so that endwise access to the guide bore 34 is not obstructed by the presence of the pins.

Each of the connecting links 14 is of identical structure and is dimensioned to have its opposite end portions received within seats defined by the portions 20a, 22a and 20b, 22b of the adjacent body sections 12. The connecting links 14 each embody a top plate 36 having an integral longitudinally extending guide member 38 formed on the undersurface thereof having a guide bore 40 extending therethrough. The connecting link 14 is initially cast with longitudinally-extending pair of slots 42, 44 and 46, 48 at the opposite ends thereof which are adapted to accommodate the opposed pairs of pins 24, 26 and 28, 30. At their under side the respective pairs or slots are bounded by L-shaped jaws 50, 52 and 54, 56. In the initial casting, the jaws are formed to define constricted leading or entry ends for the respective slots which are of a height somewhat smaller than the diameter of the pins 24, 26 and 28, 30. Thus upon endwise assembly of the connecting links 14 and the respective body sections 12, the pins enter the accommodating slots with a snap action. For example, the pins 24, 26 will enter the restricted leading ends of the slots 46, 48 upon advancing the connecting link 14 in FIG. 2 into assembly in the adjacent confronting seat of the link 12. After, the snap-action assembly is achieved, permanent locking of the body section 12 and the connected link 14 is brought about by bending the jaws 54, 56 so that their depending extensions bridge and close the ends of the slots 46, 48, as may be seen in the sectional showing of FIG. 4. The displacement of the jaws 54, 56 may be achieved by any convenient means employed for peening as is well known in the jewelry field.

An appropriate number of alternate body sections 12 and 14 are connected in an annulus and a spring 58 is arranged in the continuous guideway provided by the guide bores 34, 40 of the parts 12, 14. In the preferred form of the invention, the spring 58 is an elongated coil of stainless steel wire or hard gold which has its opposite ends anchored on a pin 60, in a manner which will be described hereinafter. The spring 58 provides uniformly distributed tension on all of the parts of the ring 10 whereby the symmetry of the body sections 12 will be maintained as the ring adjusts to various positions over its range of adjustment which is determined by the cooperating pin and slot connections between the links 14 and the body sections 12. The spring 58 is effectively caged within the body of the ring 10 and accordingly is isolated from contact against the finger of the wearer. The outer faces 12a, 14a of the respective body sections

[and link] *of links* 12, 14 are provided with settings for stones, ornamentation or the like in accordance with the style and design of the ring, particularly the spring 58 and the anchoring pin 60. The spring 58 serves a dual purpose, providing the required tension on the ring sections and serving as a guard against loss of the ring in the event that the slidable interconnection between any one of the links and the body sections breaks or opens during use. The provision of the continuous or annular spring which traverses all of the sections of the ring not only assures distributed tension about the ring but also assures uniform stress distribution on the spring. Provision for uniform stress distribution coupled with the pin and slot interconnection limits the stress developed in the spring. As will appear hereinafter, the stress is established well below the elastic limit or breaking point of the spring so that spring failure is virtually precluded.

A preferred method of assembly will now be described in detail, specific reference being made to the progressive showings of FIGS. 3 to 8 inclusive.

Figure 4:
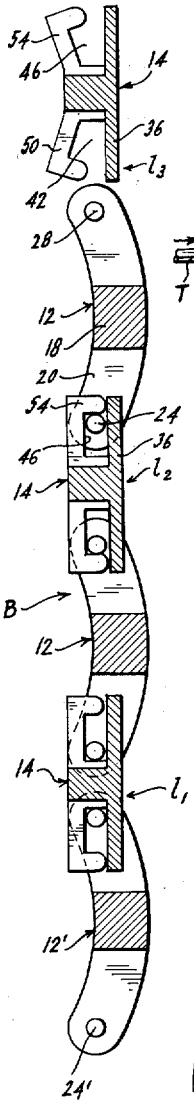
FIG. 4 is a sectional view taken substantially along the line 4—4 of FIG. 3 looking in the direction of the arrows, in a plane offset from the longitudinal median plane of the band.

Referring first to FIGS. 3 and 4, there is shown a band B consisting of alternate body sections 12 and links 14 connected together for limited sliding movement as previously detailed in conjunction with the description of FIG. 2. In this illustrative showing, the band is only partially completed in that for the ring of FIG. 1 the band consists of five body sections 12 joined in end to end relation by five connecting links 14. The band B terminates in an end adjacent connecting link section 14' at the other of its ends (see FIGS. 5 to 8 inclusive). In the illustrative showing of FIGS. 3 and 4, the body sections which join at the slidable interconnection $l_1$ are shown in the inner limit of their movement relative to each other, said inner limit being determined by the maximum inward travel of the pins of the body sections in the slots of the adjoining link. At the next slidable connection along the band B, designated by the letter $l_2$, the body sections are shown in their maximum outward displacement relative to each other, the respective pins being at the outermost ends of the slots. Finally at the location $l_3$ along the band, the connecting link is shown in position for snap assembly over the pins or studs of the adjacent body section.

Preliminary to the joining together of the respective link sections, appropriate designs are completed on the top faces 12a, 14a of the respective parts. These designs may include settings which are soldered in place for mounting of previous or semiprecious stones. Alternatively, the design on the outer surface of the ring may be completed when the various sections are linked together, this depending of course upon the type and complexity of the required ornamentation.

The completed band B is then polished and finished by techniques which are well understood in the jewelry art.

Figure 5:
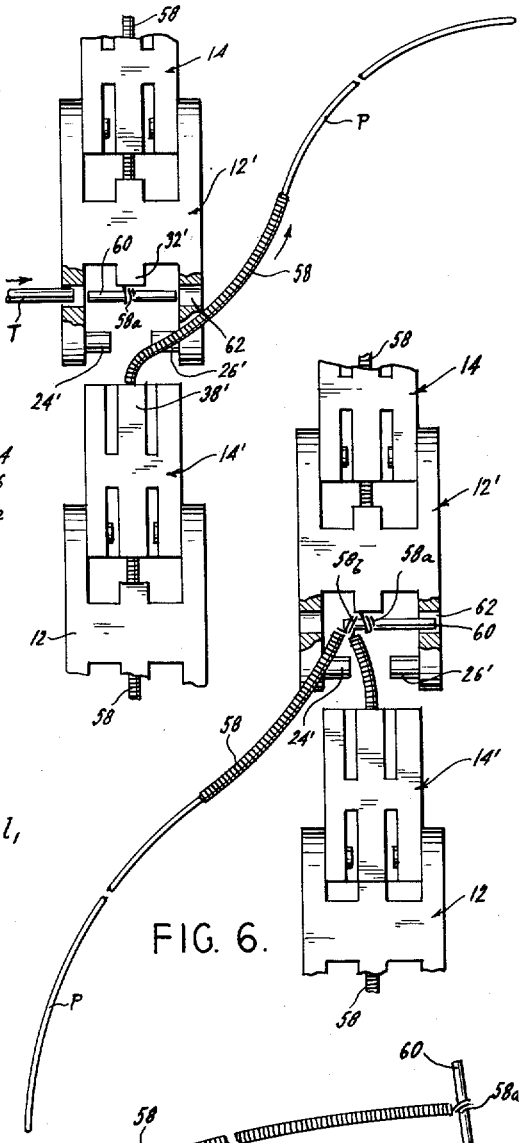
FIG. 5 is a fragmentary inside view showing an end adjacent link and body section of a partially-completed ring during a further assembly step in accordance with the present invention.
Figure 6:
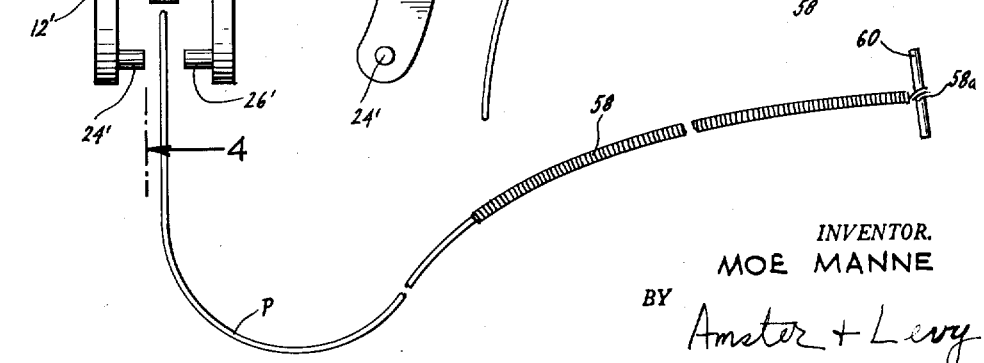
FIG. 6 is a view similar to FIG. 5, illustrating the manner in which the spring of the expandible ring is assembled with the band.

Thereupon the coil spring 58 is threaded through the aligned guide bores 34, 40 of the respective body sections and connecting links as illustrated in FIG. 3 with the aid of the pilot wire P. Before or during assembly of the coil spring with the band B, end adjacent coils 58a of the spring are wrapped about the anchoring pin 60. When the threading operation is completed, anchoring pin 60 lies across one end of the contiguous guide member 32' and the end adjacent link 12', as illustrated in FIG. 5. The pilot wire P and the coil spring emerge from the guide bore 38' of the end adjacent connecting link 14'. Upon exerting a pull on the spring 58, as indicated by the directional arrow in FIG. 5, the spring under tension and the band B forms into a ring-like configuration with the end adjacent parts 12', 14' of the band in position for connection as illustrated in the inside showing of FIG. 5 to 8 inclusive. The anchor pin 60 is displaced toward the right by the tool T shown in FIG. 5 so that the pin assumes the laterally offset position of FIG. 6. To permit the anchoring pin 60 to be laterally offset the side bars of the end adjacent body section 12' are provided with aligned holes, one being designated by the reference numeral 62. With the pin offset as shown in FIG. 6 there is sufficient working room for the other end of the spring 58 to be anchored on the pin 60 by wrapping around several of the turns of the spring as illustrated at 58b. Excess portions of the original length of spring are then cut away, and with the aid of the tool T, the anchoring pin 60 is displaced to its symmetrical position, as illustrated in FIG. 7. In placing the initial tension on the spring 58, care should be taken to avoid placing too great a stress on the spring which might bring about excessive stretching of the spring when the ring is expanded to its maximum size (i.e., the condition illustrated at location $l_2$ in FIGS. 3 and 4). Anchoring of the spring 58 on itself to provide a closed annulus which is under tension assures uniform distribution of the tension about the ring 10. After the spring is in place, the pins 24', 26' of the end adjacent body section 12' are engaged by snap-action into the aligned slots of the end adjacent connecting link 14' and a peening tool is employed to close the associated jaws to complete the assembly as illustrated in FIG. 8. As part of the final operation, an appropirate fill is placed into the holes 62 which were provided in the end adjacent body section 12' to facilitate manipulation of the anchoring pin 60 and mounting of the spring 58 within the ring 10. If for one reason or another the spring 58 is to be replaced, it is but a simple matter to open the slidable interconnection between the end adjacent links 12', 14' and remove the spring for replacement by a different spring.

A latitude of modification, substitution and variation is intended in the foregoing structure, which is intended for use primarily as a finger ring but may be used in a watchband, bracelet or the like. Accordingly, it is appropriate that the appended claims be construed broadly and in a manner consistent with the spirit and scope of the present invention.

What I claim is:

1. An expandible ring comprising a plurality of links, a first set consisting of alternate ones of said links each including longitudinally-extending bars, a transversely-extending pivot at each end of each link of said first set, a second set consisting of the remaining ones of said links each including a link body, said link body at each end having opposed longitudinally-extending parts defining an elongated slot having an entry end *opening endwise of said link body,* at least one of said parts having a projection for partially constricting the entry end *to provide a closed elongated slot, each of said closed elongated slots having a length substantially greater than the longitudinal extent of its pivot to provide a sliding connection therebetween* [of its slot] at least one of said parts being deformable toward the other of said parts to close off the entry end of its slot, said pivots and longitudinally-extending parts cooperating to connect said first and second sets of links into a ring-like body for adjustment to various ring sizes.

2. An expandible ring comprising a plurality of links, a first set consisting of alternate ones of said links each including longitudinally-extending bars, a transversely-extending pivot at each end of each link of said first set, a second set consisting of the remaining ones of said links each including a link body, said link body at each end having opposed longitudinally-extending parts defining an elongated slot having an entry end *opening endwise of said link body,* at least one of said parts having a projection for partially constricting the entry end of its slot, at least one of said parts being deformable toward the other of said parts to close off the entry end *to provide a closed elongated slot, each of said closed elongated slots having a length substantially greater than the longitudinal extent of its pivot to provide a sliding connection therebetween* [of its slot], said pivots and longitudinally-extending parts cooperating to adjustably connect said first and second sets of links into a ring-like body for adjustment to various ring sizes, and spring means within said ring-like body and biasing said ring-like body into a prescribed ring size.

3. An expandible ring comprising a plurality of links, a first set consisting of alternate ones of said links each including longitudinally-extending bars, a transversely-extending pivot at each end of each link of said first set, a second set consisting of the remaining ones of said links each including a link body, said link body at each end having opposed longitudinally-extending parts defining an elongated slot having an entry end *opening endwise of said link body,* one of said parts serving as a base and the other of said parts having a transverse projection for partially constricting the entry end of its slot, said other part being deformable toward said base to close off the entry end *to provide a closed elongated slot, each of said closed elongated slots having a length substantially greater than the longitudinal extent of its pivot to provide a sliding connection therebetween* [of its slot], said pivots and longitudinally-extending parts cooperating to slidably connect said first and second sets of links into a ring-like body for adjustment to various ring sizes, and spring means within said ring-like body and biasing said ring-like body into a prescribed ring size.

4. An expandible ring comprising a plurality of links, cooperating means adjustably connecting said links together into a ring-like body, a first set consisting of alternate ones of said links each having a curvature corresponding to a segment of said ring and including longitudinally-extending bars, a transversely-extending pivot at each end of each link of said first set, a second set consisting of the remaining ones of said links each comprising a link body at least partially accommodated between the side bars of said first set, said link body at each end having opposed longitudinally-extending parts defining an elongated slot having an entry end *opening endwise of said link body,* at least one of said parts having a projection for partially constricting the entry end of its slot, one of said parts being deformable toward the other of said parts to close off the entry end *to provide a closed elongated slot, each of said closed elongated slots having a length substantially greater than the longitudinal extent of its pivot to provide a sliding connection therebetween* [of its slot], said pivots and longitudinally-extending parts serving as said cooperating means for adjustably connecting said sets of links of ring-like body for sliding adjustment to various ring size, means extending between said side bars defining an endless guideway about said ring-like body, an elongted spring in said endless guideway, and means connecting opposite ends of said spring together under tension.

5. An expandible ring comprising a plurality of links, a first set consisting of alternate ones of said links each having a curvature corresponding to a segment of said ring and including longitudinally-extending bars, a transversely-extending pivot at each end of each link of said first set, a second set consisting of the remaining ones of said links each comprising a link body accommodated between the side bars of said first set, said link body at each end having opposed longitudinally-extending parts defining an elongated slot having an entry end *opening endwise of said link body,* one of said parts serving as a base and the other of said parts having a projection for partially constricting the entry end *to provide a closed elongated slot, each of said closed elongated slots having a length substantially greater than the longitudinal extent of its pivot to provide a sliding connection therebetween* [of its slot], said other part being deformable toward said base to close off the entry end of its slot, said pivots and longitudinally-extending parts cooperating to adjustably connect said sets of links into a ring-like body for adjustment to various ring size, and spring means extending between said side bars and about said ring-like body for biasing said ring-like body into a prescribed ring size.

6. An expandible ring comprising a plurality of links, a first set consisting of alternate ones of said links each including longitudinally-extending side bars, a transversely-extending pin at the end of each of said side bars, said pins being arranged in pairs in end to end alignment and extending toward each other to provide a pivot at each end of each link of said first set, the inner ends of said pairs of pins terminating short of the center plane of said ring, a second set consisting of the remaining ones of said links each including a link body accommodated between the side bars of said first set, opposed longitudinally extending parts defining an elongated slot having an entry end *opening endwise of said link body*, at least one of said parts having a projection for partially constricting the entry end of its slot, one of said parts being deformable toward the other of said parts *to close off the entry end to provide a closed elongated slot, each of said closed elongated slots having a length substantially greater than the longitudinal extent of its pivot to provide a sliding connection therebetween*, said pivots and parts being constructed and arranged to connect said sets of links of ring-like body for sliding adjustment to various ring size, means extending in said center plane between the inner ends of said pairs of pins defining an endless guideway about said ring-like body, and an elongated spring in said endless guideway biasing said ring-like body into the smallest of a range of size adjustments.

7. An expandible ring comprising a plurality of links, a first set consisting of alternate ones of said links each including longitudinally-extending side bars, a transversely-extending pin at the end of each of said side bars, said pins being arranged in pairs in end to end alignment and extending toward each other to provide a pivot at each end of each link of said first set, the inner ends of said pairs of pins terminating short of the center plane of said ring, a second set consisting of the remaining ones of said links each including a link body accommodated between the side bars of said first set, opposed longitudinally-extending parts defining an elongated slot having an entry end *opening endwise of said link body*, one of said parts having a transverse projection for partially constricting the entry end of its slot, said one part being deformable toward the other of said parts *to close off the entry end to provide a closed elongated slot, each of said closed elongated slots having a length substantially greater than the longitudinal extent of its pivot to provide a sliding connection therebetween*, said pivots and parts being constructed and arranged to connect said sets of links of ring-like body for sliding adjustment to various ring size, means extending in said center plane between the inner ends of said pairs of pins defining an endless guideway about said ring-like body, an elongated spring in said endless guideway, and means connecting opposite ends of said spring together under tension.

*8. In an expandible ring including a plurality of links, a first link including longitudinally-extending bars, a transversely-extending pivot at each end of said first link, a second link including a link body having at each end opposed longitudinally-extending parts defining an elongated slot having an entry end opening endwise of said link body, at least one of said parts having a projection for at least partially constricting said entry end of said slot, at least one of said parts being deformable toward the other of said parts to at least partially constrict said entry end to provide a closed elongated slot, said closed elongated slot having a length substantially greater than the longitudinal extent of its pivot to provide a sliding connection therebetween, said pivot and longitudinally-extending parts cooperating to adjustably connect said first and second links.*

*9. In an expandible ring including a plurality of links, a first link including longitudinally-extending bars, a transversely-extending pivot at the end of said first link, a second link including a link body having at an end opposed longitudinally-extending parts defining an elongated slot having an entry end opening endwise of said link body, at least one of said parts having a projection for at least partially constricting said entry end of said slot, at least one of said parts being deformable toward the other of said parts to at least partially constrict said entry end to provide a closed elongated slot, said closed elongated slot having a length substantially greater than the longitudinal extent of its pivot to provide a sliding connection therebetween, said pivot and longitudinally-extending parts cooperating to slidably connect said first and second links.*

*10. In an expandible ring including a plurality of links, an intermediate link including a link body having at each end opposed longitudinally-extending parts defining an elongated slot having an entry end opening endwise of said link body, at least one of said parts having a projection for at least partially constricting said entry end of said slot, at least one of said parts being deformable toward the other of said parts to at least partially constrict said entry end to provide a closed elongated slot, said closed elongated slot having a length substantially greater than the longitudinal extent of its pivot to provide a sliding connection therebetween, further links disposed at opposite ends of said intermediate link and respectively in end to end alignment therewith, each of said further links including longitudinally-extending bars and a transversely-extending pivot at an end thereof, the respective pivots of said further links and the longitudinally-extending parts of said intermediate link cooperating to adjustably connect said links.*

References Cited in the file of this patent or the original patent

UNITED STATES PATENTS

| | | |
|---|---|---|
| 365,115 | Bigney | June 21, 1887 |
| 1,018,663 | Harrop | Feb. 27, 1912 |
| 1,571,731 | Newman | Feb. 2, 1926 |
| 1,660,438 | Fielding | Feb. 28, 1928 |
| 2,244,637 | Better | June 3, 1941 |
| 2,302,426 | Domler | Nov. 17, 1952 |
| 2,747,259 | Brioux | May 29, 1956 |

FOREIGN PATENTS

| | | |
|---|---|---|
| 12,384 | Great Britain | Aug. 7, 1890 |